United States Patent
Fukushima et al.

(10) Patent No.: US 9,571,267 B2
(45) Date of Patent: Feb. 14, 2017

(54) DATA PROCESSOR AND DECRYPTION METHOD

(71) Applicant: Renesas Electronics Corporation, Kawasaki-shi, Kanagawa (JP)

(72) Inventors: Kazuhiko Fukushima, Tokyo (JP); Seishiro Nagano, Kanagawa (JP)

(73) Assignee: Renesas Electronics Corporation, Kanagawa (JP)

(*) Notice: Subject to any disclaimer, the term of this patent is extended or adjusted under 35 U.S.C. 154(b) by 42 days.

(21) Appl. No.: 14/734,206

(22) Filed: Jun. 9, 2015

(65) Prior Publication Data

US 2015/0381347 A1    Dec. 31, 2015

(30) Foreign Application Priority Data

Jun. 25, 2014    (JP) .................. 2014-130199

(51) Int. Cl.
| | |
|---|---|
| H04L 29/06 | (2006.01) |
| H04L 9/00 | (2006.01) |
| H04L 9/08 | (2006.01) |
| G06F 21/72 | (2013.01) |
| H04L 9/30 | (2006.01) |

(52) U.S. Cl.
CPC .............. *H04L 9/004* (2013.01); *G06F 21/72* (2013.01); *H04L 9/0841* (2013.01); *H04L 9/302* (2013.01)

(58) Field of Classification Search
CPC ......... H04L 9/302; H04L 9/0841; G06F 21/72
USPC ........................................ 380/28
See application file for complete search history.

(56) References Cited

U.S. PATENT DOCUMENTS

| 8,472,621 | B2* | 6/2013 | Daemen | .......... G06F 7/72 380/30 |
| 2002/0039420 | A1* | 4/2002 | Shacham | ........ G06F 7/723 380/277 |
| 2003/0133567 | A1* | 7/2003 | Yajima | ........... G06F 7/723 380/30 |
| 2005/0031121 | A1* | 2/2005 | Lee | ............... H04L 9/004 380/28 |

(Continued)

FOREIGN PATENT DOCUMENTS

| JP | 2010-277085 A | 12/2010 |
| JP | 2014-081426 A | 5/2014 |

*Primary Examiner* — Dao Ho
(74) *Attorney, Agent, or Firm* — Sughrue Mion, PLLC

(57) ABSTRACT

There is a need to perform recalculation against a fault attack on any public key e within a time period required for one-time modulo exponentiation.

A modulo exponentiation operation is expressed as $Y=X^d \bmod N$. The modulo exponentiation operation is performed to yield $C0=X^{d'} \bmod N$, $C1=X^d \bmod N$, and $T=X^{2^n} \bmod N$, where d' denotes two's complement of d and n denotes the number of bits in d. The modulo exponentiation operation determines whether or not a remainder resulting from the product of a value of C0 and a value of C1 modulo N matches a value of T. The modulo exponentiation operation assigns the value of C1 to Y if a match is found. The modulo exponentiation operation reports an error if a match is not found. The modulo exponentiation operation applies an RSA decryption process to a modulo exponentiation operation using the Chinese remainder theorem.

7 Claims, 9 Drawing Sheets

(56) References Cited

U.S. PATENT DOCUMENTS

| | | | |
|---|---|---|---|
| 2005/0157872 A1* | 7/2005 | Ono | H04L 9/302 |
| | | | 380/28 |
| 2007/0014395 A1* | 1/2007 | Joshi | H04L 9/0631 |
| | | | 380/28 |
| 2014/0025770 A1* | 1/2014 | Warfield | G06F 15/17331 |
| | | | 709/213 |
| 2015/0381347 A1* | 12/2015 | Fukushima | H04L 9/302 |
| | | | 380/28 |

* cited by examiner

FIG. 3

(ASSUME d = 10111001₂ AND n = 8)

| k | 0 | 1 | 2 | 3 | 4 | 5 | 6 | 7 | C0*C1 |
|---|---|---|---|---|---|---|---|---|---|
| d[k] | 1 | 0 | 0 | 1 | 1 | 1 | 0 | 1 | — |
| C0 | X | X | X7 | X7 | X7 | X7 | X71 | X71 | X256 |
| C1 | X | X | X | X9 | X25 | X57 | X57 | X185 | X185 |
| T | X2 | X4 | X8 | X16 | X32 | X64 | X128 | X256 | X256 |

*FIG. 7*

```
            INTERMEDIATE VALUES T, C, AND N
N←N
T←X
C←1
for(k=0 to n-1) n IS THE BIT LENGTH OF d
    if(d[k]=1) C←C * TmodN
    else if(d[k]=0) void←C * TmodN
    T←T * TmodN
end
OUTPUT Y = C
```

FIG. 9

(ASSUME d = 10111001$_2$ AND n = 8)

| K | 0 | 1 | 2 | 3 | 4 | 5 | 6 | 7 |
|---|---|---|---|---|---|---|---|---|
| d[k] | 1 | 0 | 0 | 1 | 1 | 1 | 0 | 1 |
| C | X | X | X | X$^9$ | X$^{25}$ | X$^{57}$ | X$^{57}$ | X$^{185}$ |
| T | X$^2$ | X$^4$ | X$^8$ | X$^{16}$ | X$^{32}$ | X$^{64}$ | X$^{128}$ | X$^{256}$ |

DATA PROCESSOR AND DECRYPTION METHOD

CROSS-REFERENCE TO RELATED APPLICATIONS

The disclosure of Japanese Patent Application No. 2014-130199 filed on Jun. 25, 2014 including the specification, drawings and abstract is incorporated herein by reference in its entirety.

BACKGROUND

The present invention relates to a technology effectively applicable to products and systems equipped with a security function such as IC cards, onboard microcomputer systems, and IOT (Internet of Things) in terms of countermeasures against a fault attack on the Chinese remainder theorem (CRT) used for the Rivest Shamir Adleman (RSA) algorithm as one of public key encryptions.

The RSA algorithm uses the Chinese remainder theorem for fast decryption. On the other hand, various attack techniques are proposed to expose secret information such as keys during execution of encryption algorithms such as RSA. A fault attack is one of dangerous attack techniques. This method generates an error using some technique during a calculation and specifies key information based on a result of this calculation and a result of the normal calculation.

RSA

The RSA algorithm uses equation $X=Z^e \bmod M$ for encryption and equation $Z=X^f \bmod M$ for decryption, where e and ne denote public keys, f denotes a private key, Z denotes plain text, and X denotes encrypted text.

The following relations hold: $1=e \times f \bmod\{(p-1)(q-1)\}$ and $M=p \times q$, where p and q denote private prime numbers.

Chinese Remainder Theorem

When the above-mentioned decryption uses the Chinese remainder theorem, plain text Z results from the following equations: $Dp=f \bmod (p-1)$; $Dq=f \bmod (q-1)$; $Xp=X^{Dp} \bmod p$; $Xq=X^{Dq} \bmod q$; $w=(Xp-Xq) \times q^{-1} \bmod p$; and $Z=w \times q + Xq$.

Fault Attack

The fault attack technique exposes secret information such as a key by comparing a correct value with a value output from a faulty state caused by injecting a noise injected into a power supply or a clock or irradiating a laser to a circuit during encryption.

Fault Attack on the Chinese Remainder Theorem

As described below, a fault attack on the Chinese remainder theorem causes a faulty state during the modulo exponentiation operation to find Xp or Xq. The fault attack causes a faulty state at the timing to execute the modulo exponentiation operation to find Xp as illustrated in FIG. 6. Given Z' denotes a calculation result to cause the faulty state and the error and Z denotes a correct calculation result, the following equations $Z-Z'=(w-w') \times q$ and $q=\gcd\{pq, (w-w') \times q\}=\gcd(M, Z-Z')$ are used to find q as the greatest common divisor of known value M and output value difference Z-Z'. This can find p and f from q. An attacker can expose private key f.

Countermeasures Against the Fault Attack

The technique described in patent literature 1 provides a countermeasure against an attack technique that illegally exposes private key f by analyzing physical information such as power consumption. The technique described in patent literature 2 provides a countermeasure against an attack that analyzes power consumption or injects an error. However, none of the technologies consider countermeasures against a fault attack on the decryption algorithm using the Chinese remainder theorem. The inventors examined the following countermeasures.

The first countermeasure is to calculate Xp and Xq each twice and output value Z if the same value results from the calculations performed twice. If a recalculation yields different results, an attack is assumed to occur and value Z is not output. This method needs to perform the modulo exponentiation operation for Xp and Xq four times.

The second countermeasure is to re-encrypt result Z ($X=Z^e \bmod M$) of a calculation using the Chinese remainder theorem. Value Z is output if the result equals input X. Value Z is not output otherwise. It is common practice to use e=65537. In this case, the re-encryption does not require a long calculation time. The calculation time is not impractical.

PRIOR ART LITERATURES

Patent Literatures

Patent Literature 1: JP-2014-81426A
Patent Literature 2: JP-2010-277085A

SUMMARY

The inventors examined the above-mentioned first and second countermeasures against the fault attack. The first countermeasure needs to perform the modulo exponentiation operation for Xp and Xq four times and considerably increases the calculation time. The second countermeasure excessively elongates the calculation time and is supposed to be impractical when value e increases as a result of using any value for e in order to increase the encryption strength.

The foregoing and other problems and novel features will become more apparent from the detailed description of the specification given below with reference to the accompanying drawings.

The following summarizes representative embodiments of the invention disclosed in this application.

A modulo exponentiation operation is expressed as $Y=X^d \bmod N$. The modulo exponentiation operation is performed to yield $C0=X^{d'} \bmod N$, $C1=X^d \bmod N$, and $T=X^{2^n} \bmod N$, where d' denotes two's complement of d and n denotes the number of bits in d. The modulo exponentiation operation determines whether or not a remainder resulting from the product of a value of C0 and a value of C1 modulo N matches a value of T. The modulo exponentiation operation assigns the value of C1 to Y if a match is found. The modulo exponentiation operation reports an error if a match is not found. The modulo exponentiation operation applies an RSA decryption process to a modulo exponentiation operation using the Chinese remainder theorem. In the specification, the exponentiation in $X^{2^n}$ described above signifies $2^n$. Namely, the specification may use the symbol ^ as an exponentiation symbol for descriptive purposes.

The following summarizes an effect available from representative embodiments of the invention disclosed in this application.

The original modulo exponentiation operation for decryption can detect whether or not an error is injected at the timing of the modulo exponentiation operation during a process of the Chinese remainder theorem used for an RSA decryption process even when any public key e is used for encryption without adding a modulo exponentiation operation or an encryption operation only for a recalculation purpose.

BRIEF DESCRIPTION OF THE DRAWINGS

FIG. 3 is an explanatory diagram illustrating the process at S2 to S9 in FIG. 2 when using $d=10111001_2$ expressed in binary form and $n=8$;

FIG. 7 is an explanatory diagram illustrating a logical description of the modulo exponentiation operation according to an ordinary binary method;

FIG. 9 is an explanatory diagram illustrating a process corresponding to the logical description of the modulo exponentiation operation in FIG. 7 when using $d=10111001_2$ expressed in binary form and $n=8$ as an example.

DETAILED DESCRIPTION

1. Summary of the Embodiment

Figure 1:
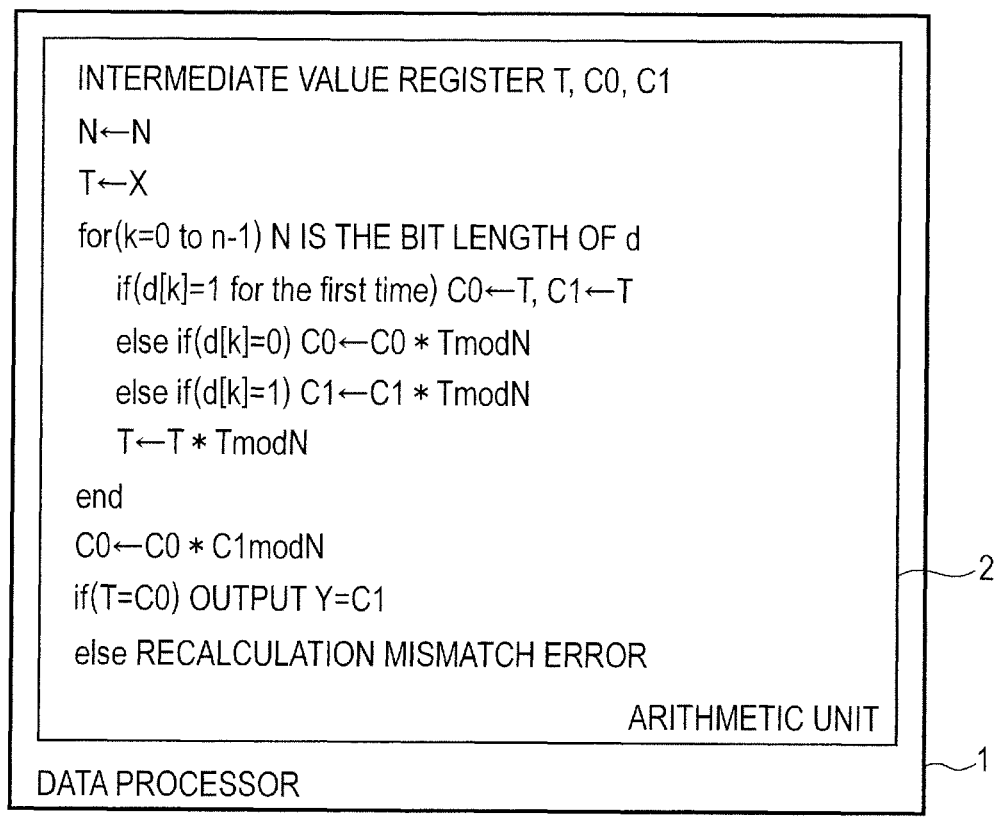
FIG. 1 is an explanatory diagram illustrating a logical description of a modulo exponentiation operation function in a data processor including an arithmetic unit 2 enabling a modulo exponentiation operation as a countermeasure against a fault attack on the Chinese remainder theorem used for RSA as one of public key encryption algorithms.

The following summarizes an embodiment disclosed in the present application. The description below to summarize the embodiment contains a parenthesized reference symbol that is found in the accompanying drawings. The parenthesized reference symbol just exemplifies an instance included in the concept of a constituent element designated by the reference symbol.

[1] Data Processor Capable of the Modulo Exponentiation Operation Against a Fault Attack A data processor (1) includes an arithmetic unit (2) that performs an RSA decryption process using the Chinese remainder theorem. The arithmetic unit performs the modulo exponentiation operation expressed as $Y=X^d \bmod N$ to calculate $C0=X^{d'} \bmod N$, $C1=X^d \bmod N$, and $T=X^{2^n} \bmod N$ (S2 through S9), where d' denotes two's complement of d and n denotes the number of bits in d. The arithmetic unit determines whether or not a remainder resulting from the product of a value of C0 and a value of C1 modulo N matches a value of T (S10 and S11). The arithmetic unit assigns the value of C1 to Y (S12) if a match is found. The arithmetic unit reports an error (S13) if a match is not found.

The original modulo exponentiation operation for decryption can detect whether or not an error is injected at the timing of the modulo exponentiation operation during a process of the Chinese remainder theorem used for an RSA decryption process even when any public key e is used for encryption without adding a modulo exponentiation operation or an encryption operation only for a recalculation purpose. This can prevent the decryption using an incorrect result of the modulo exponentiation operation corresponding to the injected error and contribute to shortening the arithmetic processing time. In other words, it is possible to shorten the arithmetic processing time to prevent a fault attack from illegally exposing a private key.

[2] Error Response when an Fault Attack is Detected

In item 1, a process to cause an error returns a value other than a value of C1.

It is possible to disable a fault attack on the decryption algorithm using the Chinese remainder theorem. An intruder cannot recognize this situation.

[3] Implementing an Arithmetic Unit Function Using Processor's Program Processing In item 1, the arithmetic unit includes work memory (4), a processor (3) to perform a program process using the work memory, and program memory (5) to store an operational program of the processor.

This can ensure flexibility to implement the arithmetic unit function.

[4] Implementing an Arithmetic Unit Function Using Specialized Hardware

In item 1, the arithmetic unit provides a modulo exponentiation operation circuit that controls and performs a modulo exponentiation operation expressed as $Y=X^d \bmod N$ based on a specified arithmetic operation command issued from a processor (13) to perform a program process.

This can further speed up a decryption process using the arithmetic unit.

[5] Modulo Exponentiation Operation Method Against a Fault Attack

A decryption method uses a data process to perform RSA decryption using the Chinese remainder theorem and the data process includes two modulo exponentiation operations. In each modulo exponentiation operation represented as $Y=X^d \bmod N$, the data process calculates $C0=X^{d'} \bmod N$, $C1=X^d \bmod N$, and $T=X^{2^n} \bmod N$ (S2 through S9), where d' denotes two's complement of d and n denotes the number of bits in d, and determines whether or not a remainder resulting from the product of a value of C0 and a value of C1 modulo N matches a value of T (S10 and S11). The data process assigns the value of C1 to Y (S12) if a match is found. The data process reports an error (S13) if a match is not found.

The original modulo exponentiation operation for decryption can detect whether or not an error is injected at the timing of the modulo exponentiation operation during a process of the Chinese remainder theorem used for an RSA decryption process even when any public key e is used for encryption without adding a modulo exponentiation operation or an encryption operation only for a recalculation purpose. This can prevent the decryption using an incorrect result of the modulo exponentiation operation corresponding to the injected error and contribute to shortening the arithmetic processing time. In other words, it is possible to shorten the arithmetic processing time to prevent a fault attack from illegally exposing a private key.

[6] Error Response when an Fault Attack is Detected

In item 5, a process to cause an error returns a value other than a value of C1.

It is possible to disable a fault attack on the decryption algorithm using the Chinese remainder theorem. An intruder cannot recognize this situation.

[7] Data Processor Capable of the Modulo Exponentiation Operation Against a Fault Attack A data processor (1) includes an arithmetic unit (2) that decrypts encrypted text X based on RSA encryption using private keys f, p, and q into plain text Z. An arithmetic process on the arithmetic unit includes a first process to find $Xp=X^{Dp} \bmod p$ using remainder Dp resulting from dividing f by p−1, a second process to find $Xq=X^{Dq}\bmod q$ using remainder Dq resulting from dividing f by q−1, a third process to find $w=(Xp-Xq)\times q^{-1}\bmod p$ using a value of Xp−Xq and inverse $q^{-1}$ of q modulo p, and a fourth process to find plain text Z using w×q+Xp. A modulo exponentiation operation equation for each of the first process and the second process is expressed as $Y=X^d\bmod N$. A process to implement this equation includes a process that calculates $C0=X^{d'}\bmod N$, $C1=X^d\bmod N$, and $T=X^{2^{\sim n}}\bmod N$ (S2 through S9), where d' denotes two's complement of d and n denotes the number of bits in d, determines whether or not a remainder resulting from the product of a value of C0 and a value of C1 modulo N matches a value of T (S10 and S11), assigns the value of C1 to Y (S12) if a match is found, and reports an error (S13) if a match is not found.

The original modulo exponentiation operation for decryption can detect whether or not an error is injected at the timing of the modulo exponentiation operation during a process of the Chinese remainder theorem used for an RSA decryption process even when any public key e is used for encryption without adding a modulo exponentiation operation or an encryption operation only for a recalculation purpose. This can prevent the decryption using an incorrect result of the modulo exponentiation operation corresponding to the injected error and contribute to shortening the arithmetic processing time. In other words, it is possible to shorten the arithmetic processing time to prevent a fault attack from illegally exposing a private key.

[8] Error Response when an Fault Attack is Detected

In item 7, a process to cause an error returns a value other than a value of C1.

It is possible to disable a fault attack on the decryption algorithm using the Chinese remainder theorem. An intruder cannot recognize this situation.

[9] Implementing an Arithmetic Unit Function Using Processor's Program Processing In item 7, the arithmetic unit includes work memory (4), a processor (3) to perform a program process using the work memory, and program memory (5) to store an operational program of the processor.

This can ensure flexibility to implement the arithmetic unit function.

[10] Implementing an Arithmetic Unit Function Using Specialized Hardware

In item 7, the arithmetic unit provides a modulo exponentiation operation circuit that controls and performs the first process through the fourth process based on a specified arithmetic operation command issued from a processor (13) to perform a program process.

This can further speed up a decryption process using the arithmetic unit.

[11] Modulo Exponentiation Operation Method Against a Fault Attack

A decryption method supplies a data processor with private keys f, p, and q and encrypted text X based on RSA encryption and decrypts encrypted text X into plain text Z. The decryption method includes a first process to find $Xp=X^{Dp}\bmod p$ using remainder Dp resulting from dividing f by p−1, a second process to find $Xq=X^{Dq}\bmod q$ using remainder Dq resulting from dividing f by q−1, a third process to find $w=(Xp-Xq)\times q^{-1}\bmod p$ using a value of Xp−Xq and inverse $q^{-1}$ of q modulo p, and a fourth process to find plain text Z using w×q+Xp. A modulo exponentiation operation equation for each of the first process and the second process is expressed as $Y=X^d\bmod N$. A process to implement this equation includes a process that calculates $C0=X^{d'}\bmod N$, $C1=X^d\bmod N$, and $T=X^{2^{\sim n}}\bmod N$ (S2 through S9), where d' denotes two's complement of d and n denotes the number of bits in d, determines whether or not a remainder resulting from the product of a value of C0 and a value of C1 modulo N matches a value of T (S10 and S11), assigns the value of C1 to Y (S12) if a match is found, and reports an error (S13) if a match is not found.

The original modulo exponentiation operation for decryption can detect whether or not an error is injected at the timing of the modulo exponentiation operation during a process of the Chinese remainder theorem used for an RSA decryption process even when any public key e is used for encryption without adding a modulo exponentiation operation or an encryption operation only for a recalculation purpose. This can prevent the decryption using an incorrect result of the modulo exponentiation operation corresponding to the injected error and contribute to shortening the arithmetic processing time. In other words, it is possible to shorten the arithmetic processing time to prevent a fault attack from illegally exposing a private key.

[12] Error Response when an Fault Attack is Detected

In item 11, a process to cause an error returns a value other than a value of C1.

It is possible to disable a fault attack on the decryption algorithm using the Chinese remainder theorem. An intruder cannot recognize this situation.

[13] Data Processor Capable of the Modulo Exponentiation Operation Against a Fault Attack A data processor (1) includes an arithmetic unit (2) that decrypts encrypted text X based on RSA encryption using private keys f, p, and q into plain text Z. An arithmetic process on the arithmetic unit includes a first process to find $Xp=X^{Dp}\bmod p$ using remainder Dp resulting from dividing f by p−1, a second process to find $Xq=X^{Dq}\bmod q$ using remainder Dq resulting from dividing f by q−1, a third process to find $w=(Xp-Xq)\times q^{-1}\bmod p$ using a value of Xp−Xq and inverse $q^{-1}$ of q modulo p, and a fourth process to find plain text Z using w×q+Xp. A modulo exponentiation operation equation for each of the first process and the second process is expressed as $Y=X^d\bmod N$. A process to implement this equation includes: a process to initialize a T register to X (S1); a process to sequentially reference bits in d and rewrite the T register with a remainder resulting from the square of a value in the T register modulo N each time a bit is referenced (S5); a process to rewrite a C0 register and a C1 register with a value in the T register each time a bit in d is referenced until a referenced bit in d first matches 1 (S4); a process to rewrite the C1 register with a remainder resulting from the product of a value of the C1 register and a value of the T register modulo N each time a bit set to 1 in d is referenced (S8) and rewrite the C0 register with a remainder resulting from the product of a value of the C0 register and a value of the T register modulo N each time a bit set to 0 in d is referenced (S7) when once a referenced bit in d is set to 1; and a process to determine, after referencing all bits in d, whether or not a remainder resulting from the product of a value of the C0 register and a value of the C1 register modulo N matches a value of the T register, assign the value of the C1 register to Y (S12) if a match is found, and report an error (S13) if a match is not found.

The original modulo exponentiation operation for decryption can detect whether or not an error is injected at the timing of the modulo exponentiation operation during a process of the Chinese remainder theorem used for an RSA decryption process even when any public key e is used for encryption without adding a modulo exponentiation operation or an encryption operation only for a recalculation purpose. This can prevent the decryption using an incorrect result of the modulo exponentiation operation corresponding to the injected error and contribute to shortening the arithmetic processing time. In other words, it is possible to shorten the arithmetic processing time to prevent a fault attack from illegally exposing a private key.

[14] Error Response when an Fault Attack is Detected

In item 13, a process to cause an error returns a value other than a value of the C1 register.

It is possible to disable a fault attack on the decryption algorithm using the Chinese remainder theorem. An intruder cannot recognize this situation.

[15] Implementing an Arithmetic Unit Function Using Processor's Program Processing In item 13, the arithmetic unit (2) includes: work memory (4) that can be used as the T register, the C10 register, and the C1 register and is used as an area to store the value d; a processor (3) to perform a program process using the work memory; and program memory (5) to store an operational program of the processor.

This can ensure flexibility to implement the arithmetic unit function.

[16] Implementing an Arithmetic Unit Function Using Specialized Hardware

In item 13, the arithmetic unit provides a modulo exponentiation operation circuit that performs an arithmetic operation based on a specified arithmetic operation command. The arithmetic unit includes a command register (20), parameter registers (22 and 23), a control circuit (21), and an arithmetic circuit (24). A program processor writes the specified arithmetic operation command to the command register. The parameter register is allocated to the T register, the C0 register, and the C1 register, and contains an area to set the value d. The control circuit references the specified arithmetic operation command written to the command register and the value d placed in the parameter register and allows the arithmetic circuit to perform the first process through the fourth process using the T register, the C0 register, and the C1 register.

This can further speed up a decryption process using the arithmetic unit.

[17] Modulo Exponentiation Operation Method Against a Fault Attack

A decryption method supplies a data processor with private keys f, p, and q and encrypted text X based on RSA encryption and decrypts encrypted text X into plain text Z. The decryption method includes a first process to find $Xp=X^{Dp}\bmod p$ using remainder Dp resulting from dividing f by $p-1$, a second process to find $Xq=X^{Dq}\bmod q$ using remainder Dq resulting from dividing f by $q-1$, a third process to find $w=(Xp-Xq)\times q^{-1}\bmod p$ using a value of $Xp-Xq$ and inverse $q^{-1}$ of q modulo p, and a fourth process to find plain text Z using $w\times q+Xp$. A modulo exponentiation operation equation for each of the first process and the second process is expressed as $Y=X^d\bmod N$. A process to implement this equation includes: a process to initialize a T register to X (S1); a process to sequentially reference bits in d and rewrite the T register with a remainder resulting from the square of a value in the T register modulo N each time a bit is referenced (S5); a process to rewrite a C0 register and a C1 register with a value in the T register each time a bit in d is referenced until a referenced bit in d first matches 1 (S4); a process to rewrite the C1 register with a remainder resulting from the product of a value of the C1 register and a value of the T register modulo N each time a bit set to 1 in d is referenced (S8) and rewrite the C0 register with a remainder resulting from the product of a value of the C0 register and a value of the T register modulo N each time a bit set to 0 in d is referenced (S7) when once a referenced bit in d is set to 1; and a process to determine, after referencing all bits in d, whether or not a remainder resulting from the product of a value of the C0 register and a value of the C1 register modulo N matches a value of the T register, assign the value of the C1 register to Y (S12) if a match is found, and report an error (S13) if a match is not found.

The original modulo exponentiation operation for decryption can detect whether or not an error is injected at the timing of the modulo exponentiation operation during a process of the Chinese remainder theorem used for an RSA decryption process even when any public key e is used for encryption without adding a modulo exponentiation operation or an encryption operation only for a recalculation purpose. This can prevent the decryption using an incorrect result of the modulo exponentiation operation corresponding to the injected error and contribute to shortening the arithmetic processing time. In other words, it is possible to shorten the arithmetic processing time to prevent a fault attack from illegally exposing a private key.

[18] Error Response when an Fault Attack is Detected

In item 17, a process to cause an error returns a value other than a value of the C1 register.

It is possible to disable a fault attack on the decryption algorithm using the Chinese remainder theorem. An intruder cannot recognize this situation.

2. Details of the Embodiment

The embodiment will be described in more detail.

Arithmetic Unit that Performs an RSA Decryption Process Using the Chinese Remainder Theorem FIG. 1 illustrates a data processor 1 applicable to products and systems equipped with a security function such as IC cards, onboard microcomputer systems, and IOT. The data processor includes an arithmetic unit 2 enabling a modulo exponentiation operation as a countermeasure against a fault attack on the Chinese remainder theorem used for RSA as one of public key encryption algorithms. FIG. 1 illustrates a function of the modulo exponentiation operation in the arithmetic unit 2 according to a logical description.

The RSA and the Chinese remainder theorem have been already described and need to be considered as a prerequisite for the following description. The data processor 1 performs an arithmetic process that decrypts encrypted text X into plain text Z according to a specified algorithm using the RSA and the Chinese remainder theorem described above. Obviously, the data processor 1 supports an arithmetic process that encrypts plain text Z into encrypted text X.

The RSA arithmetic process for decryption uses equation $Z=X^f\bmod M$, where e and ne denote public keys, f denotes a private key, Z denotes plain text, and X denotes encrypted text. The following relations hold: $1=e\times f\bmod\{(p-1)(q-1)\}$ and $M=p\times q$, where p and q denote private prime numbers. When the above-mentioned arithmetic process for decryption uses the Chinese remainder theorem in consideration of these relations, plain text Z results from the following equations: $Dp=f\bmod(p-1)$; $Dq=f\bmod(q-1)$; $Xp=X^{Dp}\bmod p$ (first process); $Xq=X^{Dq}\bmod q$ (second process); $w=(Xp-Xq)\times q^{-1}\bmod p$ (third process); and $Z=w\times q+Xq$ (fourth process).

Figure 2:
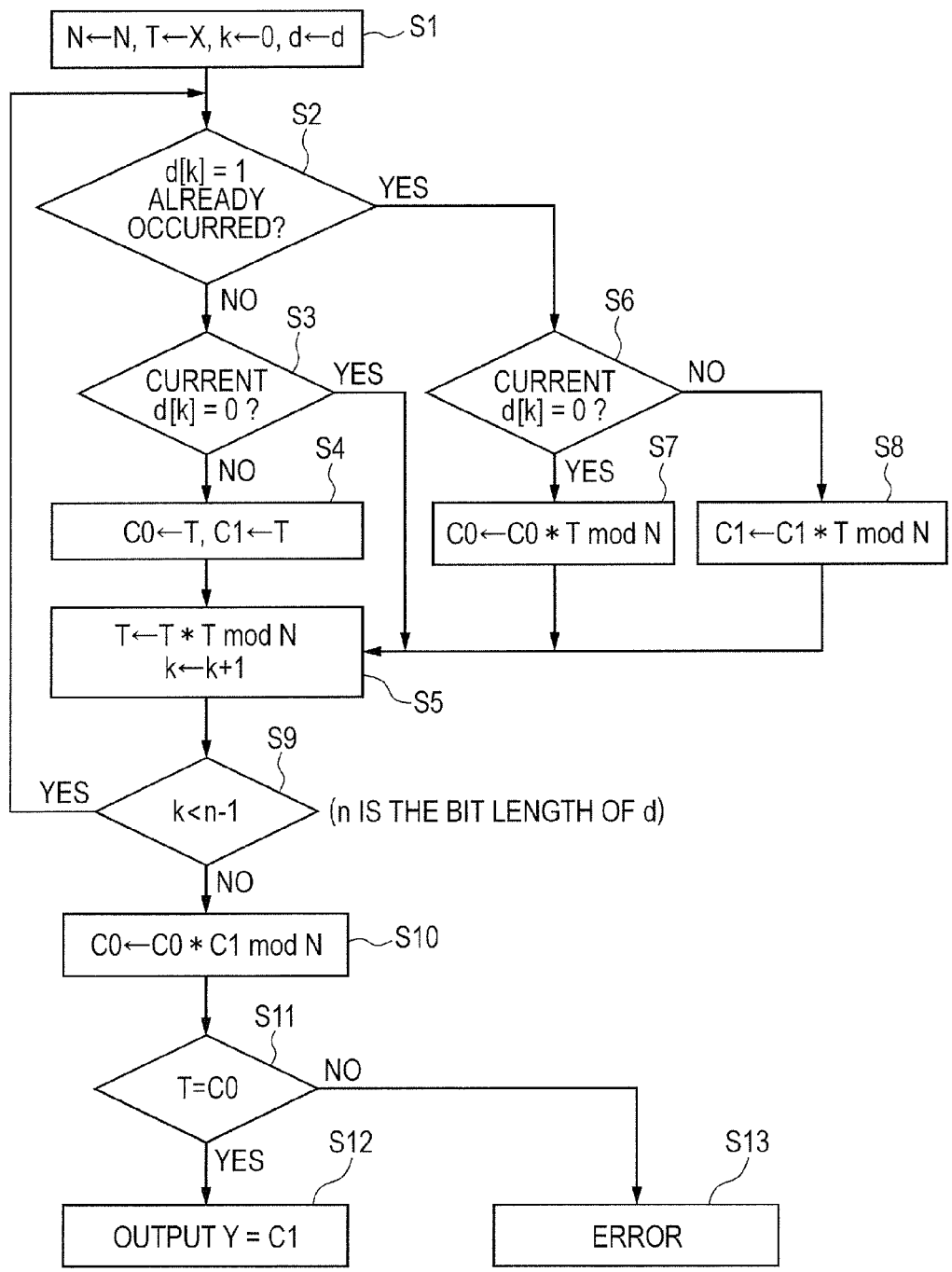
FIG. 2 is a flowchart illustrating a specific arithmetic process corresponding to the logical description in FIG. 1.

The logical description of the arithmetic unit 2 in FIG. 2 prevents the first process or the second process from returning an arithmetic operation result when a fault attack occurs to inject an error into the first process or the second process. The logical description illustrated in FIG. 1 assumes that the first process and the second process use a modulo exponentiation operation equation expressed as $Y=X^d\bmod N$ for descriptive purposes. Namely, the first process $Xp=X^{Dp}$modp assumes $Xp=Y$, $Dp=d$, and $p=N$. The second process $Xq=X^{Dq}$modq assumes $Xp=Y$, $Dq=d$, and $q=N$. In FIG. 1, symbol * signifies the multiplication. A letter $k=0$ to $n-1$ signifies a bit number assigned to n-bit wide d from the least significant bit.

The logical description of the arithmetic unit 2 as illustrated in FIG. 1 assumes that a modulo exponentiation operation equation for each of the first process and the second process is expressed as $Y=X^d$modN. A process to implement this equation calculates $C0=X^{d'}$modN, $C1=X^d$modN, and $T=X^{2^n}$modN, where d' denotes two's complement of d and n denotes the number of bits in d. The process determines whether or not a remainder resulting from the product of a value of C0 and a value of C1 modulo N matches a value of T. The process assigns the value of C1 to Y (S12) if a match is found. The reports an error (S13) if a match is not found. The following describes this process specifically.

Arithmetic Process Method of $Y=X^d$modN

FIG. 2 illustrates a flowchart of a specific arithmetic process corresponding to the logical description in FIG. 1. An arithmetic process of $Y=X^d$modN uses a T register, a C0 register, a C1 register, a k register, and a d register. For ease of description in FIG. 2, the T register, the C0 register, the C1 register, the k register, and the d register are simply represented as T, C0, C1, k, and d along with symbol ←. The k register contains a value corresponding to bit numbers 0 to n−1 from the least significant bit of value d placed in the d register. The T register, the C0 register, and the C1 register temporarily store intermediate values T, C0, and C1.

The N register is set to value N. The T register is initialized to encrypted text X. The k register is set to initial value 0. The d register is set to value d (S1).

The process determines whether or not value d[k]=1 as the bit number placed in the k register already occurs (S2). If the value does not occur yet, the process determines whether or not the current value is d[k]=0 (S3), namely, d[k]=1 occurs for the first time (S2=No and S3=No). Alternatively, the process determines whether or not d [k]=1 does not occur yet (S2=No and S3=Yes). The process rewrites the T register with an arithmetic operation result of T*TmodN and updates the value of the k register to k+1 (S5) regardless of whether or not d[k]=1 does not occur yet or d[k]=1 occurs for the first time. If d[k]=1 occurs for the first time, the process initializes the C0 register to the value of T and initializes the C1 register to the value of T at the time (S4).

At S2, value d[k]=1 as the bit number placed in the k register may already occur (S2=Yes). In this case, the process determines whether or not the current value is d[k]=0. If the current value is d[k]=0 (S6=Yes), the process rewrites the C0 register with an arithmetic operation result of C0*TmodN (S7). If the current value is d[k]=1 (S6=No), the process rewrites the C1 register with an arithmetic operation result of C1*TmodN (S8). The process proceeds to S5 subsequent to S7 and S8.

Subsequent to S5, the process determines whether or not bits of value d have been checked for their logical values up to the most significant bit (k<n−1) (S9). The process is repeated from S2 to S8 until the most significant bit is reached.

Figure 8:
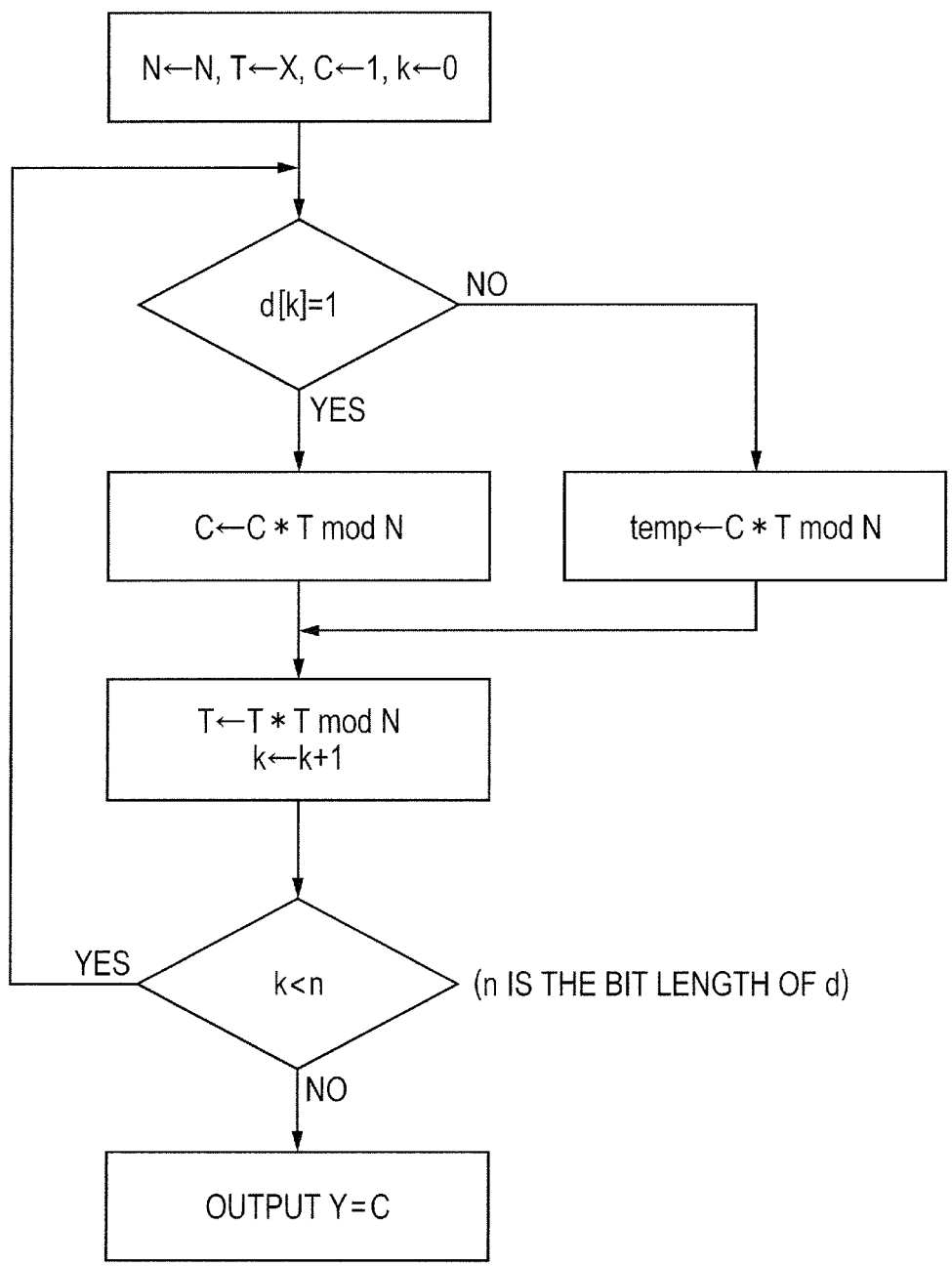
FIG. 8 is a flowchart illustrating an arithmetic process to implement the logical description in FIG. 7.

The process from S2 to S8 may be considered as a modified process based on a binary method comparable to the modulo exponentiation operation. An ordinary binary method is illustrated as a logical description in FIG. 7 and an arithmetic process flow in FIG. 8. The process updates intermediate values C and T when each bit of d is set to value 1. The process updates only value T when each bit of d is set to value 0. The value finally placed in C equals Y as an arithmetic operation result. FIG. 9 illustrates exponents for intermediate value C and exponents for intermediate value T corresponding to value d[k] for each of bits in k=0 to 7 using $d=10111001_2$ expressed in binary form and n=8 as an example. Given k=4 (d[k]=1), for example, the exponent for intermediate value C is $X^9+X^{16}=X^{25}$.

Unlike the ordinary binary method, the process at S2 to S9 updates intermediate values C1 and T when each bit in d is set to value 1. The process updates intermediate values C0 and T when each bit in d is set to value 0. The former corresponds to modulo exponentiation operation $C1=X^d$modN using exponent d. The latter corresponds to modulo exponentiation operation $C0=X^{d'}$modN using d' as two's complement of d. In particular, value 1 is placed in complement d' of d whose bit is set to value 1 for the first time. When the bit is set to value 1 for the first time, the value of the T register is placed in C0 as well as C1 as illustrated at S4.

Similarly to FIG. 9, FIG. 3 illustrates an example of the process at S2 to S9 when using $d=10111001_2$ expressed in binary form and n=8. FIG. 3 also illustrates only the exponentiation concerning C0, C1, and T for descriptive purposes. An exponentiation value for T is multiplied by $X^2$ each time k is incremented by one. When d[k]=1 is satisfied, an exponentiation value for C0 equals the immediately preceding value. When d[k]=0 is satisfied, an exponentiation value for C0 equals a result of multiplying the exponentiation value for immediately preceding C0 by the exponentiation value for immediately preceding T. When d[k]=0 is satisfied, an exponentiation value for C1 equals the immediately preceding value. When d[k]=1 is satisfied, an exponentiation value for C1 equals a result of multiplying the exponentiation value for immediately preceding C1 by the exponentiation value for immediately preceding T. Since d and d' are complementary to each other, the multiplication between an exponentiation value for C0 and an exponentiation value for C1 equals an exponentiation value for T at each k.

Suppose that the process at S2 through S9 is complete after sequentially referencing all bits in d. The process then rewrites the C0 register with a remainder resulting from multiplying the value of the C0 register by the value of the C1 register modulo N (S10). The process determines whether or not the value of the C0 register equals the value of the T register (S11). As a result of the determination at S11, the value of the C0 register equals the value of the T register if, for example, laser irradiation does not explicitly inject an error during the process of the modulo exponentiation operation expressed as $Y=X^d$modN. According to the example in FIG. 3, the value is $X^{71} \times X^{185} = X^{256}$.

The process outputs Y=C1 as an arithmetic operation result (S12) if a match is found in the determination at S11. The process performs an error process (S13) if a match is not found.

The process performs the arithmetic operation sequentially from the least significant bit in d and writes the same value to the C0 register and the C1 register when a bit in d is set to 1 for the first time. The process updates the register values in C0 and T when each bit of d is set to 0. The process updates the register values in C1 and T when each bit of d is set to 1. Given that d' is two's complement of d, the final calculation results in $C0=X^{d'}$modN, $C1=X^d$modN, and $T=X^{2^n}$modN. The relation is $C0 \times C1 \bmod N = X^{(d+d')} \bmod N = X^{2^n} \bmod N = T$. The process outputs C1 as calculation result Y if T equals C0×C1modN. Otherwise, the process performs an error process on the assumption an attack occurred. The error process does not output Y or outputs any value other than C1.

According to this arithmetic processing method, the original modulo exponentiation operation for decryption can detect whether or not an error is injected at the timing of the modulo exponentiation operation during a process of the Chinese remainder theorem used for an RSA decryption process even when any public key e is used for encryption without adding a modulo exponentiation operation or an encryption operation only for a recalculation purpose. This can prevent the decryption using an incorrect result of the modulo exponentiation operation corresponding to the injected error and contribute to shortening the arithmetic processing time. In other words, it is possible to perform recalculation against a fault attack on any public key e within a time period required for one-time modulo exponentiation and shorten the arithmetic processing time to prevent a fault attack from illegally exposing a private key.

Example of the Data Processor

Figure 4:
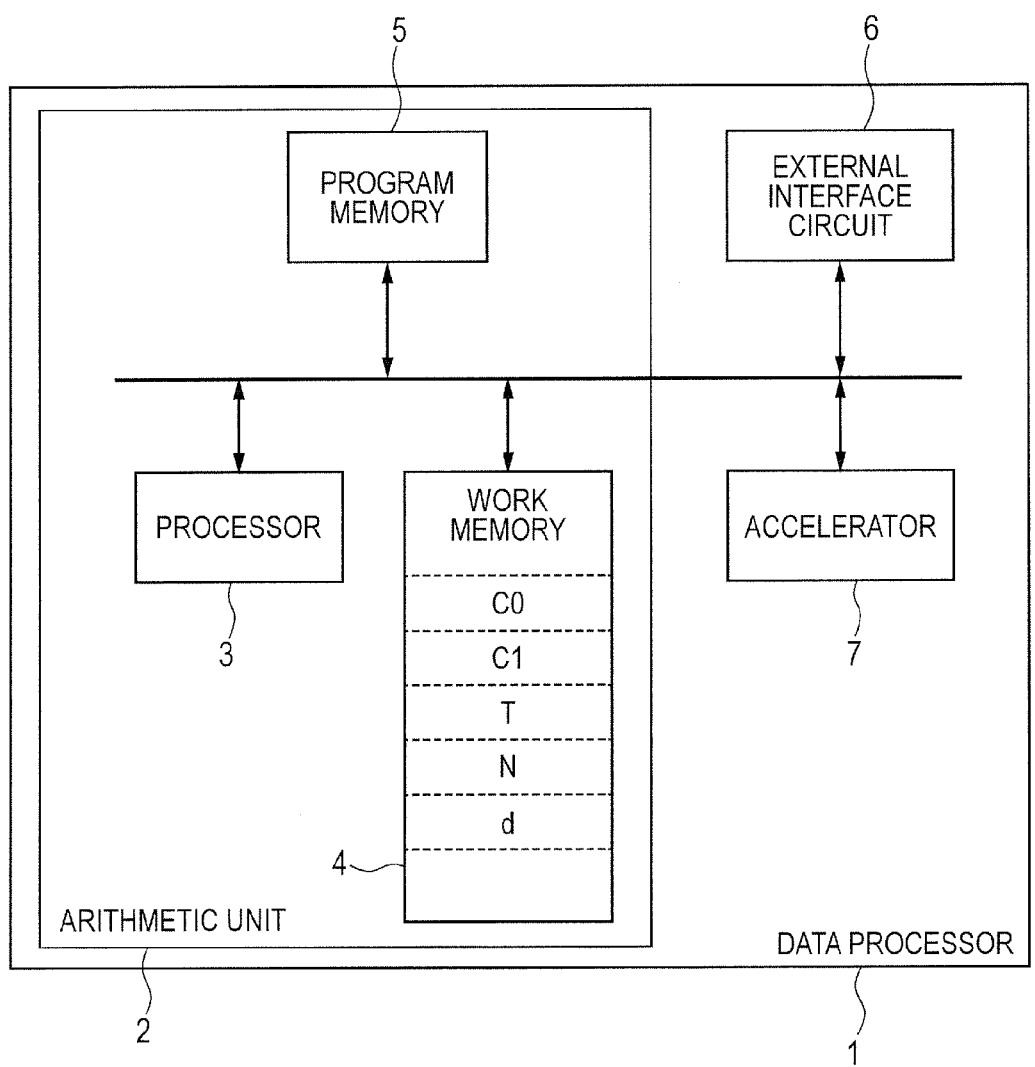
FIG. 4 is a block diagram illustrating an example of the data processor that performs a program to implement an arithmetic unit function.

FIG. 4 illustrates an example of the data processor 1. The data processor 1 illustrated in FIG. 4 implements the function of the arithmetic unit 2 using processor's program processing. The arithmetic unit 2 includes work memory 4, a processor 3 to perform a program process using the work memory 4, and program memory 5 to store an operational program of the processor. The processor 3 includes at least a central processing unit. The processor 3 sequentially fetches instructions from the program memory and decodes the instructions to control and perform an arithmetic operation sequence for the above-mentioned RSA decryption process using the Chinese remainder theorem. The work memory 4 provides a storage area for the T register, the C0 register, the C1 register, the N register, and the d register and provides the other work areas. The processor 3 accesses and uses the work memory 4. The data processor 1 also includes an external interface circuit 6 and an accelerator 7. In addition to the central processing unit, the processor 3 may undoubtedly include the other circuit units such as cache memory, an address conversion buffer, a floating-point arithmetic unit.

The data processor 1 can be configured as a single-chip LSI on one semiconductor substrate based on a CMOS integrated circuit manufacturing technology. Alternatively, the data processor 1 can be also configured as a multi-chip semiconductor integrated circuit module including several semiconductor chips or several semiconductor devices mounted on a circuit board. The arithmetic unit 2 can be also configured as a multi-chip module including several semiconductor devices.

Program processing of the processor 3 implements the function of the arithmetic unit 2. This can ensure flexibility to implement the arithmetic unit function.

Figure 5:
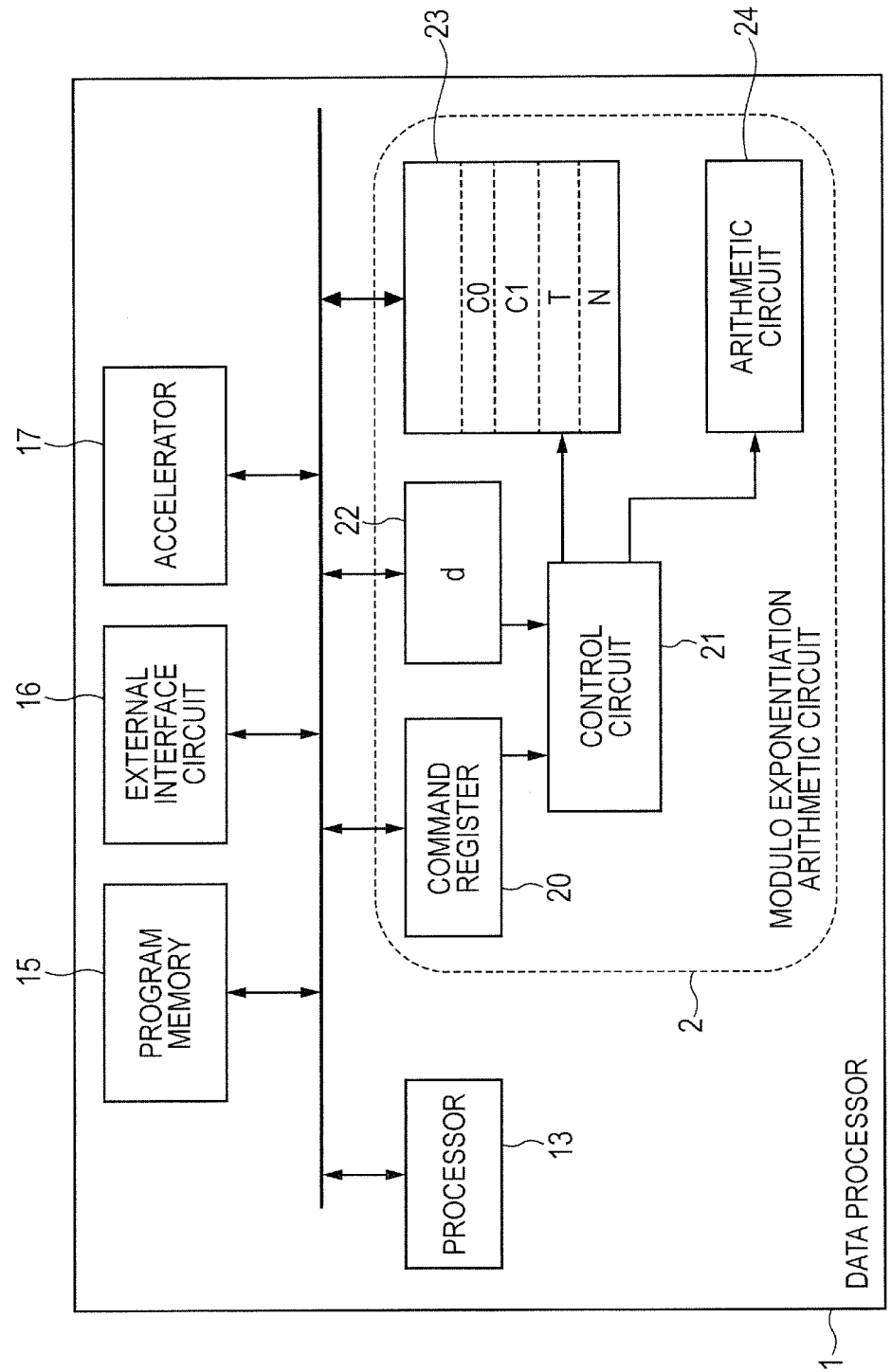
FIG. 5 is a block diagram illustrating another example of the data processor that uses specialized hardware to implement an arithmetic unit function.
Figure 6:
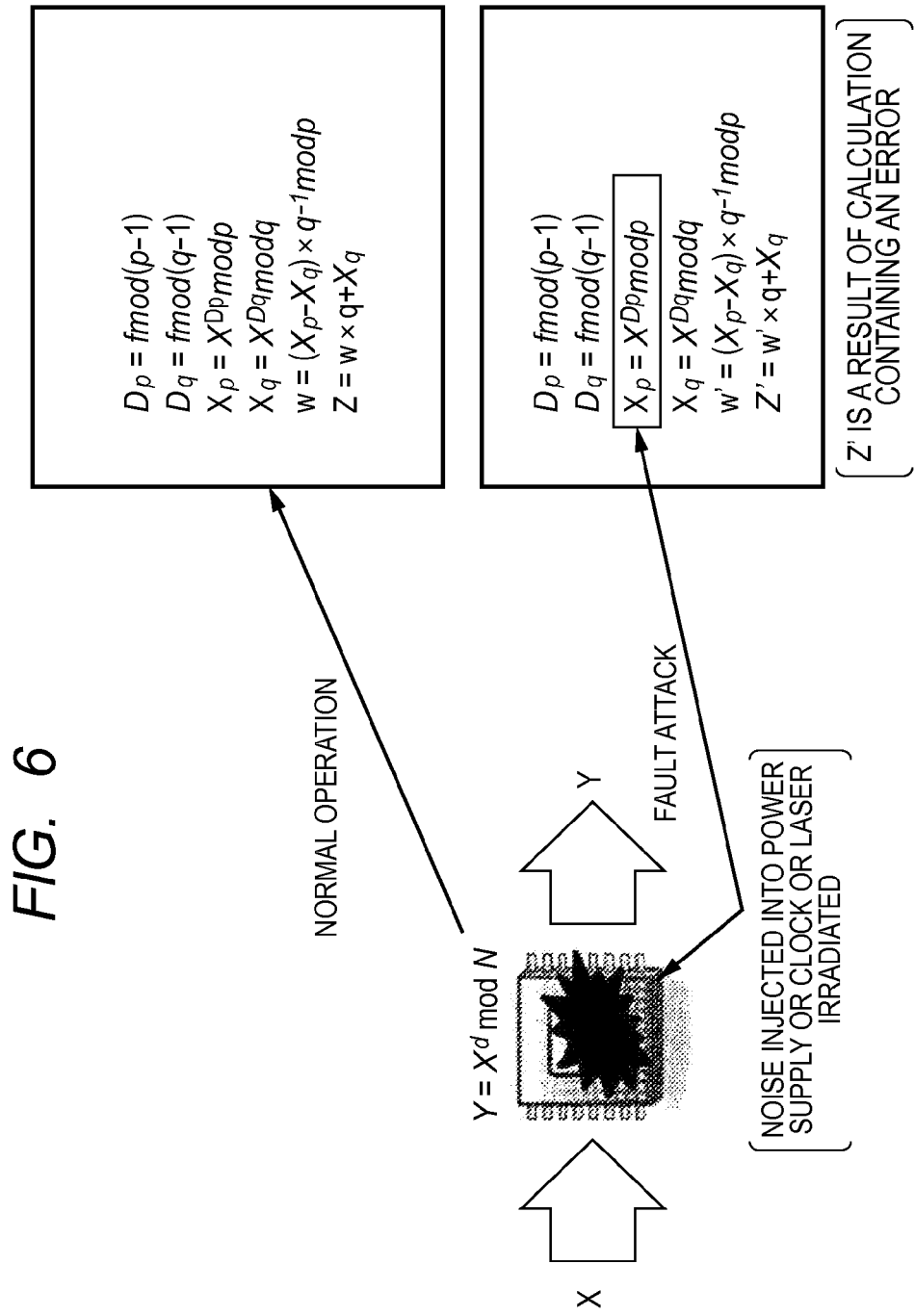
FIG. 6 is an explanatory diagram illustrating a fault attack causing a faulty state during a modulo exponentiation operation that finds Xp and Xq during a process of the Chinese remainder theorem.

FIG. 5 illustrates another example of the data processor 1. The data processor 1 illustrated in FIG. 5 uses specialized hardware to implement the function of the arithmetic unit 2. The arithmetic unit 2 configures a modulo exponentiation operation circuit that performs arithmetic operation based on a specified arithmetic operation command. The arithmetic unit 2 to configure the modulo exponentiation operation circuit includes a command register 20, parameter registers 22 and 23, a control circuit 21, and an arithmetic circuit 24. A processor 13 as a program processor writes a specified arithmetic operation command to the command register 20. The processor 13 fetches a program stored in program memory 15 and executes the program. The T register, the C0 register, the C1 register, and the N register are allocated to the parameter register 23. The parameter register 22 is used as an area to place value d. The arithmetic circuit 24 includes an arithmetic-logic circuit or a multiplication circuit. The control circuit 21 references a specified arithmetic operation command written to the command register 20 and value d placed in the parameter register 22, uses the T register, the C0 register, the C1 register, and the N register, and allows the arithmetic circuit 24 to perform arithmetic operation for the above-mentioned RSA decryption using the Chinese remainder theorem. The data processor 1 also includes an external interface circuit 16 and an accelerator 17. In addition to the central processing unit, the processor 3 may undoubtedly include the other circuit units such as cache memory, an address conversion buffer, a floating-point arithmetic unit.

The data processor 1 can be configured as a single-chip LSI on one semiconductor substrate based on a CMOS integrated circuit manufacturing technology. The arithmetic unit 2 to configure the modulo exponentiation operation circuit can be assumed to be one accelerator. The data processor 1 in FIG. 5 can be also configured as a multi-chip semiconductor integrated circuit module including several semiconductor chips or several semiconductor devices mounted on a circuit board. The arithmetic unit 2 can be also configured as a multi-chip module including several semiconductor devices.

The use of the arithmetic unit 2 configured as the specialized hardware can further speed up a decryption process.

It is to be distinctly understood that the present invention is not limited to the above-mentioned embodiment but may be otherwise variously embodied within the spirit and scope of the invention.

For example, the invention is not limited to the binary technique that is based on the right binary method and develops the same in order to perform the modulo exponentiation operation while determining logical values for bits in d. Obviously, the invention is also applicable to a technique that is based on the left binary method and develops the same.

The process flow in FIG. 2 provides a mere example. Obviously, details of the flow may be modified as needed.

What is claimed is:

1. A data processor system comprising:
a memory configured to store an operational program; and
a processor configured to execute the operational program and when executing the operational program performs an arithmetic process that decrypts encrypted text X based on Rivest Shamir Adleman (RSA) encryption using private keys f, p, and q into plain text Z,
wherein the arithmetic process includes a first process to find $Xp=X^{Dp} \bmod p$ using remainder Dp resulting from dividing f by p−1, a second process to find $Xq=X^{Dq} \bmod q$ using remainder Dq resulting from dividing f by q−1, a third process to find $w=(Xp-Xq) \times q^{-1} \bmod p$ using a value of Xp−Xq and inverse $q^{-1}$ of q modulo p, and a fourth process to find plain text Z using w×q+Xp;
wherein a modulo exponentiation operation equation for each of the first process and the second process is expressed as $Y=X^d \bmod N$; and
wherein a process to implement this equation includes:
a process to initialize a T register to X;
a process to sequentially reference bits in d and rewrite the T register with a remainder resulting from the square of a value in the T register modulo N each time a bit is referenced;

a process to rewrite a C0 register and a C1 register with a value in the T register each time a bit in d is referenced until a referenced bit in d first matches 1;

a process to rewrite the C1 register with a remainder resulting from the product of a value of the C1 register and a value of the T register modulo N each time a bit set to 1 in d is referenced and rewrite the C0 register with a remainder resulting from the product of a value of the C0 register and a value of the T register modulo N each time a bit set to 0 in d is referenced when once a referenced bit in d is set to 1, and a process to determine, after referencing all bits in d, whether or not a remainder resulting from the product of a value of the C0 register and a value of the C1 register modulo N matches a value of the T register, assign the value of the C1 register to Y when a match is found, and report an error when a match is not found.

2. The data processor system according to claim 1, wherein a process to cause an error returns a value other than a value of the C1 register.

3. The data processor system according to claim 1, further comprising:

a work memory configured for use as the T register, the C10 register, and the C1 register and as an area to store the value d;

wherein the processor is configured to perform the arithmetic process using the work memory.

4. A data processor system comprising:

a modulo arithmetic circuit configured to perform an arithmetic process that decrypts encrypted text X based on Rivest Shamir Adleman (RSA) encryption using private keys f, p, and q into plain text Z, wherein the arithmetic process includes a first process to find $Xp=X^{Dp} \bmod p$ using remainder Dp resulting from dividing f by p−1, a second process to find $Xq=X^{Dq} \bmod q$ using remainder Dq resulting from dividing f by q−1, a third process to find $w=(Xp-Xq) \times q^{-1} \bmod p$ using a value of Xp−Xq and inverse $q^{-1}$ of q modulo p, and a fourth process to find plain text Z using $w \times q + Xp$;

wherein a modulo exponentiation operation equation for each of the first process and the second process is expressed as $Y=X^d \bmod N$; and wherein a process to implement this equation includes:

a process to initialize a T register to X;

a process to sequentially reference bits in d and rewrite the T register with a remainder resulting from the square of a value in the T register modulo N each time a bit is referenced;

a process to rewrite a C0 register and a C1 register with a value in the T register each time a bit in d is referenced until a referenced bit in d first matches 1;

a process to rewrite the C1 register with a remainder resulting from the product of a value of the C1 register and a value of the T register modulo N each time a bit set to 1 in d is referenced and rewrite the C0 register with a remainder resulting from the product of a value of the C0 register and a value of the T register modulo N each time a bit set to 0 in d is referenced when once a referenced bit in d is set to 1, and a process to determine, after referencing all bits in d, whether or not a remainder resulting from the product of a value of the C0 register and a value of the C1 register modulo N matches a value of the T register, assign the value of the C1 register to Y when a match is found, and report an error when a match is not found.

5. A decryption method that supplies a data processor with private keys f, p, and q and encrypted text X based on Rivest Shamir Adleman (RSA) encryption and decrypts encrypted text X into plain text Z, the method comprising:

a first process to find $Xp=Xp=X^{Dp} \bmod p$ using remainder Dp resulting from dividing f by p−1;

a second process to find $Xq=X^{Dq} \bmod q$ using remainder Dq resulting from dividing f by q−1;

a third process to find $w=(Xp-Xq) \times q^{-1} \bmod p$ using a value of Xp−Xq and inverse $q^{-1}$ of q modulo p; and a fourth process to find plain text Z using $w \times q + Xp$, wherein a modulo exponentiation operation equation for each of the first process and the second process is expressed as $Y=X^d \bmod N$; and wherein a process to implement this equation includes:

a process to initialize a T register to X;

a process to sequentially reference bits in d and rewrite the T register with a remainder resulting from the square of a value in the T register modulo N each time a bit is referenced;

a process to rewrite a C0 register and a C1 register with a value in the T register each time a bit in d is referenced until a referenced bit in d first matches 1;

a process to rewrite the C1 register with a remainder resulting from the product of a value of the C1 register and a value of the T register modulo N each time a bit set to 1 in d is referenced and rewrite the C0 register with a remainder resulting from the product of a value of the C0 register and a value of the T register modulo N each time a bit set to 0 in d is referenced when once a referenced bit in d is set to 1, and a process to determine, after referencing all bits in d, whether or not a remainder resulting from the product of a value of the C0 register and a value of the C1 register modulo N matches a value of the T register, assign the value of the C1 register to Y when a match is found, and report an error when a match is not found.

6. The decryption method according to claim 5, wherein a process to cause an error returns a value other than a value of the C1 register.

7. The data processor system according to claim 4, wherein the modulo arithmetic circuit comprises a modulo exponentiation operation circuit that performs an arithmetic operation based on a specified arithmetic operation command, a command register, a parameter register, a control circuit, and an arithmetic circuit;

wherein a program processor writes the specified arithmetic operation command to the command register;

wherein the parameter register is allocated to the T register, the C0 register, and the C1 register, and contains an area to set the value d; and wherein the control circuit references the specified arithmetic operation command written to the command register and the value d placed in the parameter register and allows the arithmetic circuit to perform the first process through the fourth process using the T register, the C0 register, and the C1 register.

* * * * *